UNITED STATES PATENT OFFICE.

EDWARD MENDELSOHN, OF ST. LOUIS, MISSOURI, ASSIGNOR, BY DIRECT AND MESNE ASSIGNMENTS, TO CARBON CLEANING COMPOUND COMPANY, OF ST. LOUIS, MISSOURI, A CORPORATION OF MISSOURI.

COMPOSITION OF MATTER FOR REMOVING INCRUSTATIONS FROM INTERNAL-COMBUSTION ENGINES.

1,244,114.   Specification of Letters Patent.   Patented Oct. 23, 1917.

No Drawing.   Application filed February 24, 1913.   Serial No. 750,399.

*To all whom it may concern:*

Be it known that I, EDWARD MENDELSOHN, a citizen of the United States, residing at city of St. Louis, State of Missouri, have invented a certain new and useful Improvement in Compositions of Matter for Removing Incrustations from Internal-Combustion Engines, of which the following is a full, clear, and exact description, such as will enable others skilled in the art to which it appertains to make and use the same.

My invention relates to a new composition of matter designed to be used for removing incrustations which gather in the cylinders, explosion chambers, and valves of internal combustion engines, and has for its object the production of such a composition which will be cheap to manufacture, safe and easy to use, and rapid and thorough in its action.

My invention also relates to the particular method in which the various elements of the combination are combined to form the new composition.

The composition is composed of the following ingredients:

| | |
|---|---|
| Alcohol | 25% |
| Commercial ether | 18% |
| Aqua ammonia | 57% |

The aqua ammonia which I have found most effective is that known as 10% or 16 degree strength. However, the invention is not limited to the use of ammonia of that strength, as, within limit, a stronger or weaker solution will be effective.

In producing the new composition, the ingredients are combined in the following manner:

First, three-fifths of the alcohol is mixed with the ether. The ammonia is then added and then the remaining two-fifths of the alcohol is put in. When the ingredients are mixed in this manner, the ether is not permitted to volatilize and the elements are positively combined without stratifying and produce a new composition which acts in a manner and produces results when used in the manner intended which cannot be accomplished where the elements are used separately or one after another.

In using the composition in internal combustion engines, a proper amount of the mixture is injected into the explosion chamber or cylinder or applied to such other portion of the engine as it is desired to treat, whereupon it volatilizes rapidly. As the composition volatilizes, the incrustations of carbon, scale, or grease, scale or flake off of the metal, leaving the parts absolutely clean. The fumes of the composition also attack such incrustations as they reach in the valve housings, valves and valve seats and cause such incrustations to scale or flake off of the metal, even though the composition is not applied directly to them in liquid form. The action is very rapid and all of the parts will be freed from the incrustations in a very short time after the composition is applied, and if left in the presence of the fumes a sufficient length of time, all of the detached scale will be reduced to a very fine powder.

In the use of this composition, it is not necessary to work the parts which it is desired to clean, as all of the parts to which the fumes have access are rapidly cleaned without the necessity of their being subject to any friction or abrasive manipulation.

Having described my invention, what I claim as new and desire to claim by Letters Patent is:

1. A composition of the class described produced by the mixture of substantially 25% alcohol, 57% aqua ammonia, and 18% commercial ether.

2. As a composition of matter for removing carbon deposits from internal combustion engines, a volatile solution consisting of alcohol, aqua ammonia and commercial ether.

In testimony whereof I hereunto affix my signature in the presence of two witnesses, this 10th day of February, 1913.

EDWARD MENDELSOHN.

Witnesses:
M. P. SMITH,
C. S. BUTLER.